(12) United States Patent
Arnott

(10) Patent No.: US 10,733,769 B2
(45) Date of Patent: Aug. 4, 2020

(54) SYSTEMS AND METHODS FOR GENERATING COLOR SCHEMES

(71) Applicant: Lyft, Inc., San Francisco, CA (US)

(72) Inventor: John Kevyn Arnott, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 36 days.

(21) Appl. No.: 16/107,973

(22) Filed: Aug. 21, 2018

(65) Prior Publication Data

US 2020/0066002 A1    Feb. 27, 2020

(51) Int. Cl.
| | |
|---|---|
| *G09G 5/02* | (2006.01) |
| *H04N 1/60* | (2006.01) |
| *G06T 11/00* | (2006.01) |
| *G06T 7/90* | (2017.01) |
| *H04N 5/57* | (2006.01) |

(52) U.S. Cl.
CPC ............. *G06T 11/001* (2013.01); *G06T 7/90* (2017.01); *H04N 1/6005* (2013.01); *H04N 1/6075* (2013.01)

(58) Field of Classification Search
CPC ......... G06T 11/001; G06T 7/90; G06F 3/408; H04N 1/6005; H04N 1/6075; H04N 1/6002
See application file for complete search history.

(56) References Cited

U.S. PATENT DOCUMENTS

| | | | | |
|---|---|---|---|---|
| 2009/0175526 A1* | 7/2009 | Ramsay | ............... | G06K 9/6224 382/132 |
| 2010/0157397 A1* | 6/2010 | Qiao | ................... | H04N 1/6022 358/518 |
| 2011/0058735 A1* | 3/2011 | Tastl | .................... | H04N 1/6016 382/162 |
| 2015/0150526 A1* | 6/2015 | Ohishi | .................. | A61B 6/463 378/62 |
| 2016/0089097 A1* | 3/2016 | Ohishi | ................. | A61B 6/5235 378/62 |

\* cited by examiner

*Primary Examiner* — Wesner Sajous
(74) *Attorney, Agent, or Firm* — FisherBroyles LLP

(57) ABSTRACT

The disclosed computer-implemented method may include generating color schemes. In some embodiments, the systems described herein may generate a color scheme by plotting non-linear curves through various planes that each represent an attribute of a color, selecting points on the curves, and generating colors from the values of the points. By generating colors schemes based on non-linear curves, the systems described herein may easily and efficiently generate aesthetically pleasing color schemes with colors predictably clustered in light and dark luminosities, facilitating the creation of user interfaces that are accessible to visually impaired users. Various other methods, systems, and computer-readable media are also disclosed.

20 Claims, 10 Drawing Sheets
(6 of 10 Drawing Sheet(s) Filed in Color)

Color Scheme 200

Input
500

```
color = new ColorSet
    name:"Blue"
    steps:11
    curveLum: inQuad
    curveSat: outQuad
    hueCurve: outQuad
    input:230
    endHue:220
    end:1
    start:.02
    satStart:.02
    satEnd:.8
    satRate:.97
    minor:
        0:1
```

SYSTEMS AND METHODS FOR GENERATING COLOR SCHEMES

BACKGROUND

Many organizations have custom color schemes for their organization or for individual products or product lines. A color scheme may help create a cohesive look and user experience as well as creating an association between the particular color scheme and the product or organization. In many cases, color schemes are created manually by human designers, who may rely on their subjective perception, their intuition, or primitive color palette tools that provide different shades of a given color according to a linear progression.

However, relying on the perception of a single designer is a brittle approach and may not be scalable. If the designer leaves the organization, the color scheme may have to be abandoned because the designer is no longer present to update the color scheme with new colors as needed. Furthermore, a linear progression of colors may be unsuitable for many design purposes. For example, a linear color progression may not transition cleanly between dark and light colors at a predictable point, making it more difficult to select contrasting shades that will be clearly visible to users with visual impairments such as color blindness. Accordingly, the instant disclosure identifies and addresses a need for additional and improved systems and methods for generating color schemes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate a number of exemplary embodiments and are a part of the specification. Together with the following description, these drawings demonstrate and explain various principles of the instant disclosure.

FIG. 5 is an illustration of example user input to a color scheme generation system.

FIG. 6 is an illustration of an example color scheme generated based on a non-linear function.

DETAILED DESCRIPTION OF EXEMPLARY EMBODIMENTS

The present disclosure is generally directed to generating color schemes by defining non-linear curves such as Bezier curves through color spaces (e.g., luminosity, saturation, and/or hue) and defining colors based on points on the curves. In some examples, generating a color scheme in a semi-automated fashion through the use of non-linear curves may enable developers and/or designers to easily and efficiently create aesthetically pleasing color schemes that can easily be adapted in the future by re-using the original functions but adding more steps to generate additional colors. In some embodiments, a color scheme generated via non-linear curves may have a clear distinction between dark and light colors and/or have colors clustered at high and low luminosities. In some examples, the systems described herein may automatically apply a human-readable naming scheme to the color scheme that may enable the creation of accessible color schemes where dark text is used on light backgrounds and vice versa without requiring designers and/or developers to manually check colors against one another for contrast. The term "accessible," as used herein, generally refers to a combination of colors that is provides clearly visible contrast (e.g., clearly readable text) to a broad spectrum of users that includes, e.g., users without visual impairments who may have varying perceptions of color and users with visual impairments including, but not limited to, color-blindness and diminished visual acuity who may have difficulty distinguishing between objects that are similarly colored.

Accordingly, as may be appreciated, the systems and methods described herein may improve the functioning of a computer that displays user interfaces. For example, these systems and methods may improve the functioning of the computer by generating color schemes that streamline the creation of accessible user interfaces, improving the usability of the computing device for users with visual impairment. Furthermore, for the reasons mentioned above and to be discussed in greater detail below, the systems and methods described herein may provide advantages to the field of user interface design and/or brand management by automating the generation and/or maintenance of aesthetically appealing and accessible color schemes.

Figure 1:
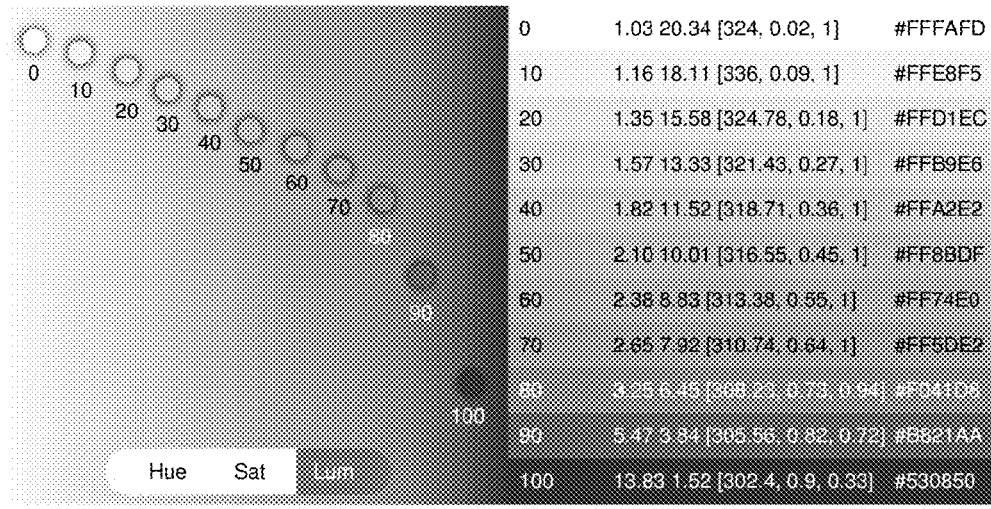
FIG. 1 is an illustration of an example color scheme generated based on a linear function.
Figure 1:
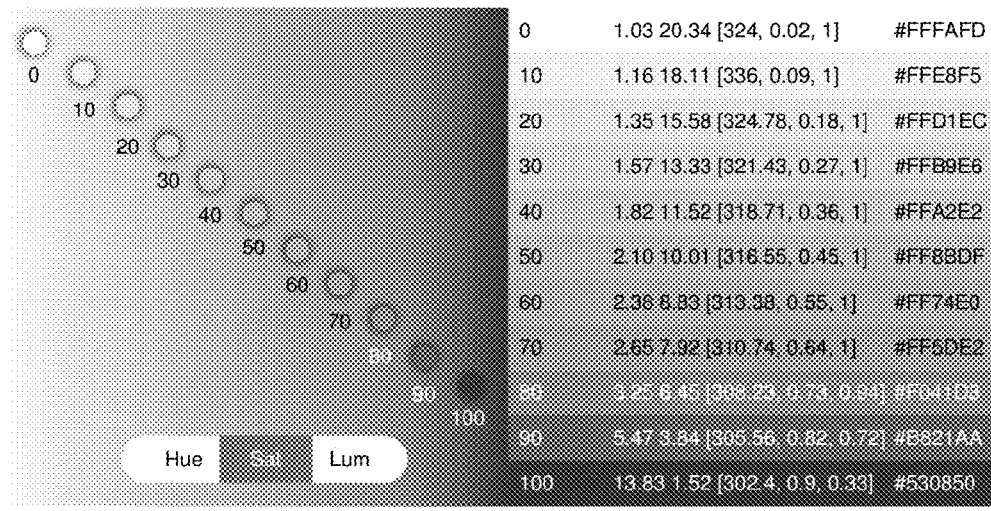
Figure 1:
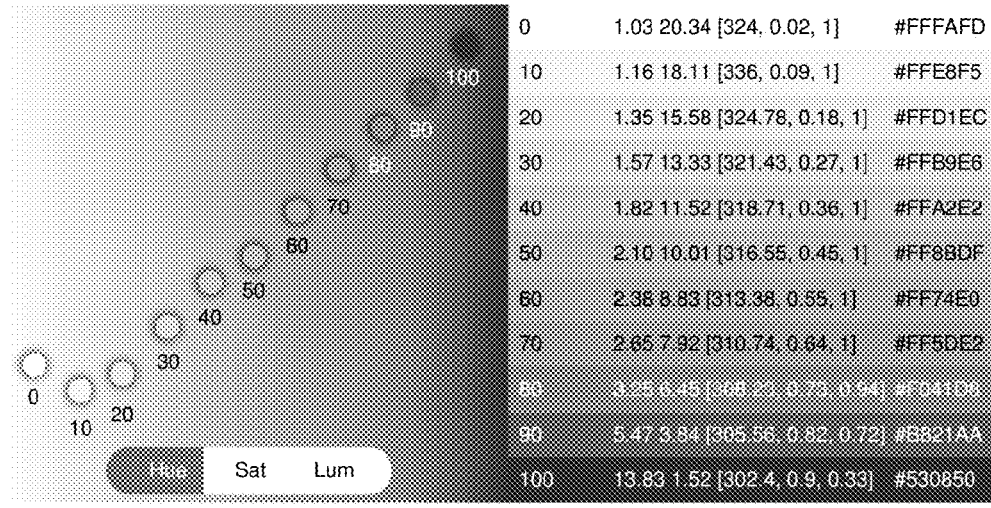

FIG. 1 is an illustration of an example color scheme 100 generated based on a linear function. As illustrated in FIG. 1, color scheme 100 may be generated by defining a linear function through three spaces representing the hue, saturation, and luminosity of a color, selecting points on the line and/or curve formed by the linear function, and then translating the values of those points into a color mapping scheme such as hue, saturation, lightness (HSL) and/or hue, saturation, value (HSV). The term "color scheme," as used herein, generally refers to any coordinated set of colors (e.g., selected and/or generated for aesthetic and/or functional properties when viewed in combination). In some examples, the term "color scheme" may refer to a set of colors with a similar hue. In some examples, a color scheme generated via a linear function may not have a balance of and/or a clear transition between light and dark colors. For example, color scheme 100 has more colors with high luminosity values (i.e., light colors) than colors with low luminosity values (i.e., dark colors). In some examples, it may not be immediately obvious to a human designer and/or developer based on the names and/or hex values of the colors which colors within color scheme 100 have acceptable contrast with black text and which colors have acceptable contrast with white text to fulfill accessibility requirements. In some examples, some colors within color scheme 100 may not be clearly dark or light (e.g., may have midrange luminosity) and may not have acceptable levels of contrast with either black or white text to fulfill accessibility requirements for high-contrast text, making those colors less usable when designing user interfaces.

Additionally, color schemes generated using linear functions may be less aesthetically appealing because human eyesight does not perceive all hues equally. For example, humans with normal color vision typically perceive more hues in the green spectrum than in the red spectrum. Therefore, a color scheme generation algorithm that treats green and red hues identically may produce unsatisfactory results.

Figure 2:
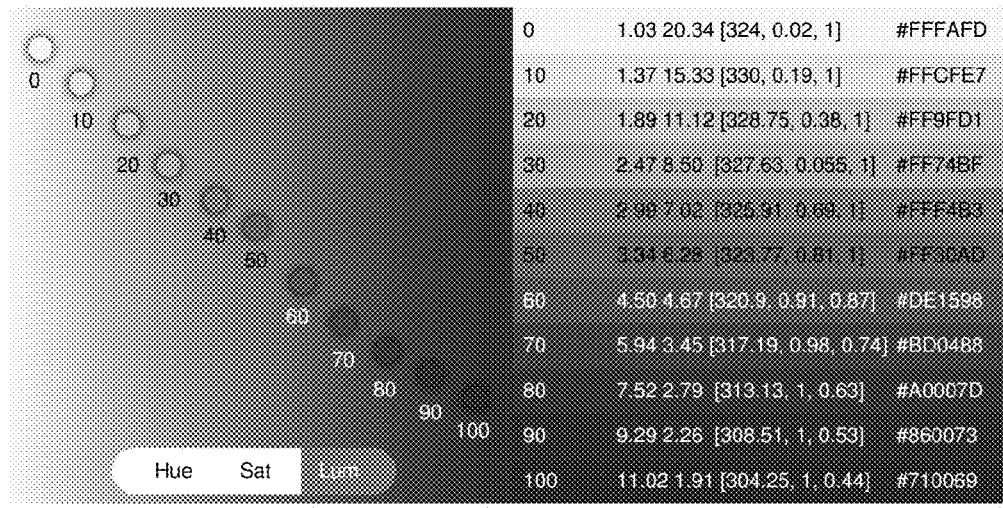
FIG. 2 is an illustration of an example color scheme generated based on a non-linear function.
Figure 2:
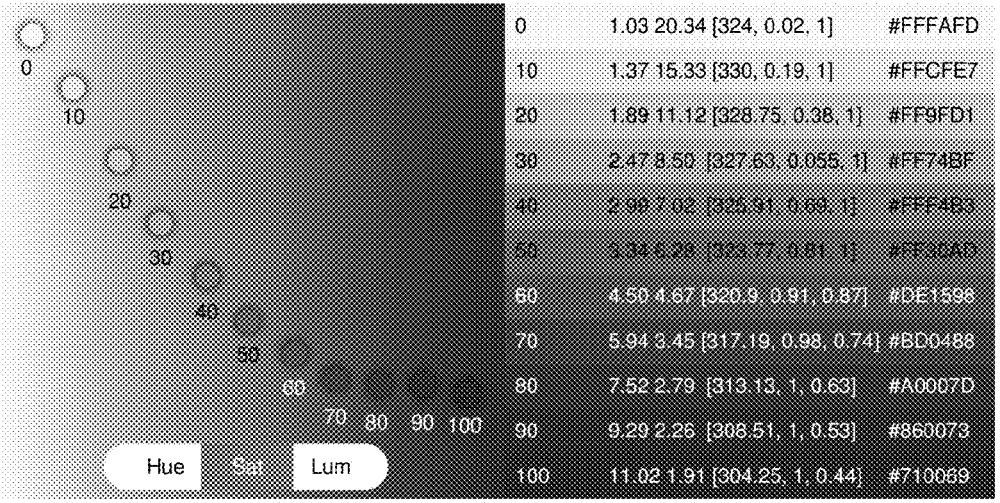
Figure 2:
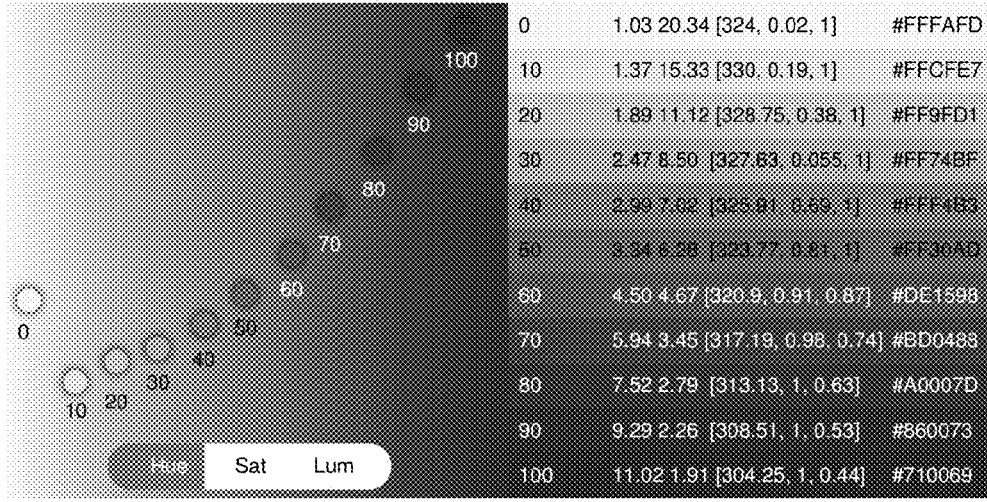

FIG. 2 is an illustration of an example color scheme 200 generated based on a non-linear function. The term "non-linear," as used herein, generally refers to any function and/or result from a function where the change of output is not directly proportional to the change in input. Examples of non-linear curves may include, without limitation, quadratic Bezier curves and/or cubic Bezier curves. As illustrated in FIG. 2, the systems described herein may generate color scheme 200 by defining an function that produces a non-linear curve, plotting the curve through a space that represents luminosity, a space that represents saturation, and a space that represents hue, selecting a set of points on each curve, and then transforming the points into colors by applying the values of the points to a color definition scheme such as HSV and/or HSL. In some examples, the systems described herein may use a combination of elements from different color definition schemes, such as the saturation element of HSV and the lightness (i.e., luminosity) element of HSL.

In some examples, color scheme 200 may be evenly and/or predictably split between light and dark colors. In some embodiments, the systems described herein may automatically name colors with a human-readable naming scheme such that a designer and/or developer is able to determine, based on the name of a color, whether the color is light or dark and therefore whether the color will have acceptable contrast with black or white text. For example, the systems described herein may append the name of the hue to a number describing the luminosity of the color to create a naming scheme. For example, the systems described herein may name the colors in color scheme 200 "magenta 10" through "magenta 100." In some embodiments, a naming scheme may include a distinction between light and dark colors. For example, any colors with names that include numbers below 60 may be dark colors and any colors with names that include numbers 60 or above may be light colors. In one example, a designer and/or developer may be able to determine, based on the names of the colors, that "magenta 30" has acceptable contrast with black text while "magenta 80" has acceptable contrast with white text. In some embodiments, the systems described herein may limit the way in which colors are generated to avoid generating colors that cannot be used in accessible combinations. For example, yellow hues may seldom or never have contrast against white, so the systems described herein may not generate colors that have both a yellow hue and a luminosity that is translated into the naming scheme as 60 or above.

In some embodiments, the systems described herein may use different curves for hue, saturation, and/or luminosity. For example, as illustrated in FIG. 2, each color space that contributes to color scheme 200 has a different curve plotted through the color space. Additionally or alternatively, the systems described herein may use the same curve for hue, saturation, and/or luminosity. In some embodiments, the systems described herein may plot multiple curves and/or multiple instances of the same curve through multiple separate two-dimensional spaces. Additionally or alternatively, the systems described herein may plot one or more curves through a three-dimensional space and select points on one curve, point on multiple curves, and/or points where multiple curves intersect.

Figure 3:
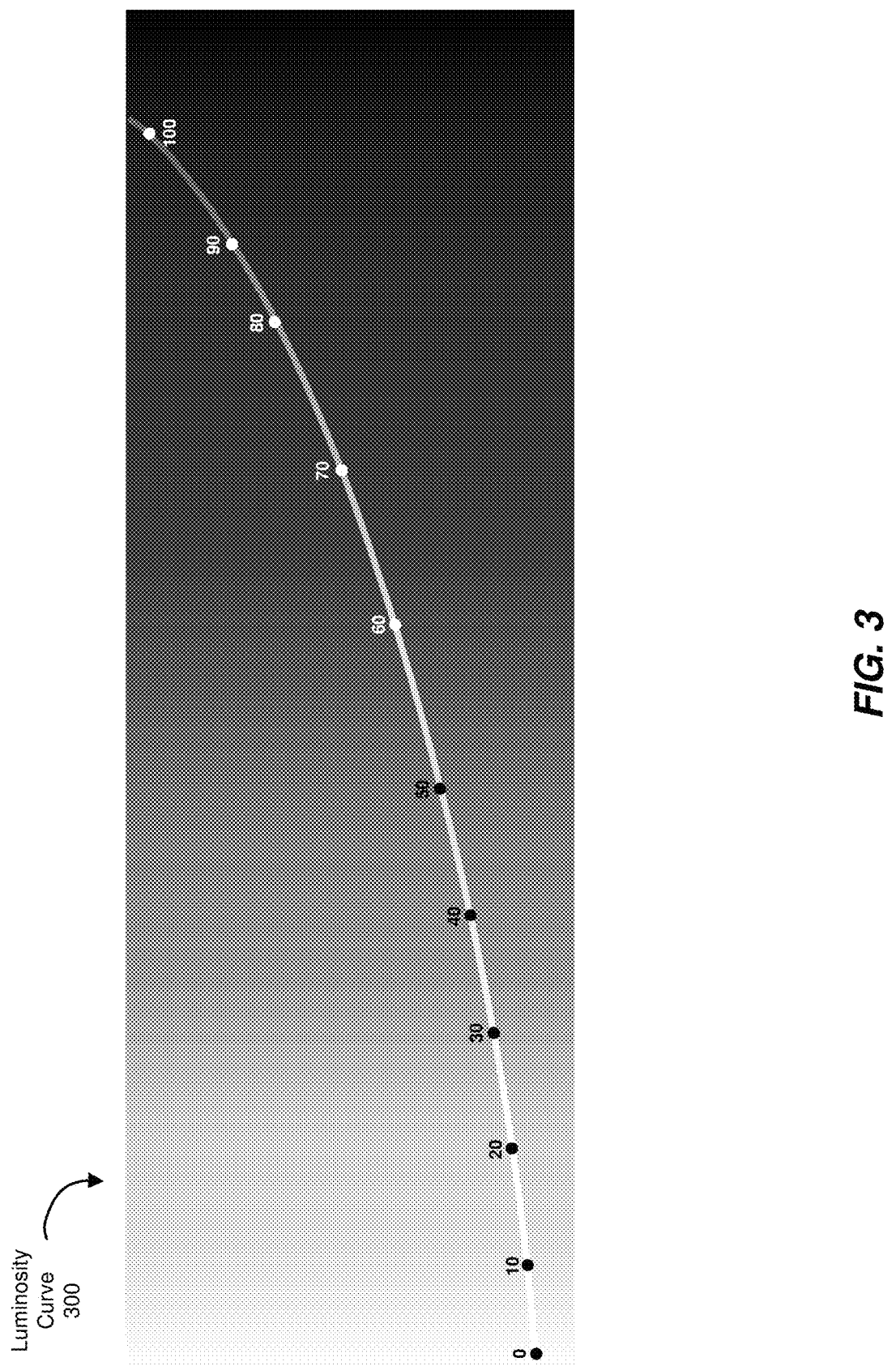
FIG. 3 is an illustration of an example non-linear curve.

FIG. 3 is an illustration of an example non-linear luminosity curve 300 through a blue hue. As illustrated in FIG. 3, luminosity curve 300 passes through a space representing luminosity such that values on luminosity curve 300 are more concentrated in lighter and darker spaces rather than in mid-tones. In one example, the bottom half of points on luminosity curve 300 may have acceptable contrast with black while the top half of points of luminosity curve 300 may have acceptable contrast with white.

Figure 4:
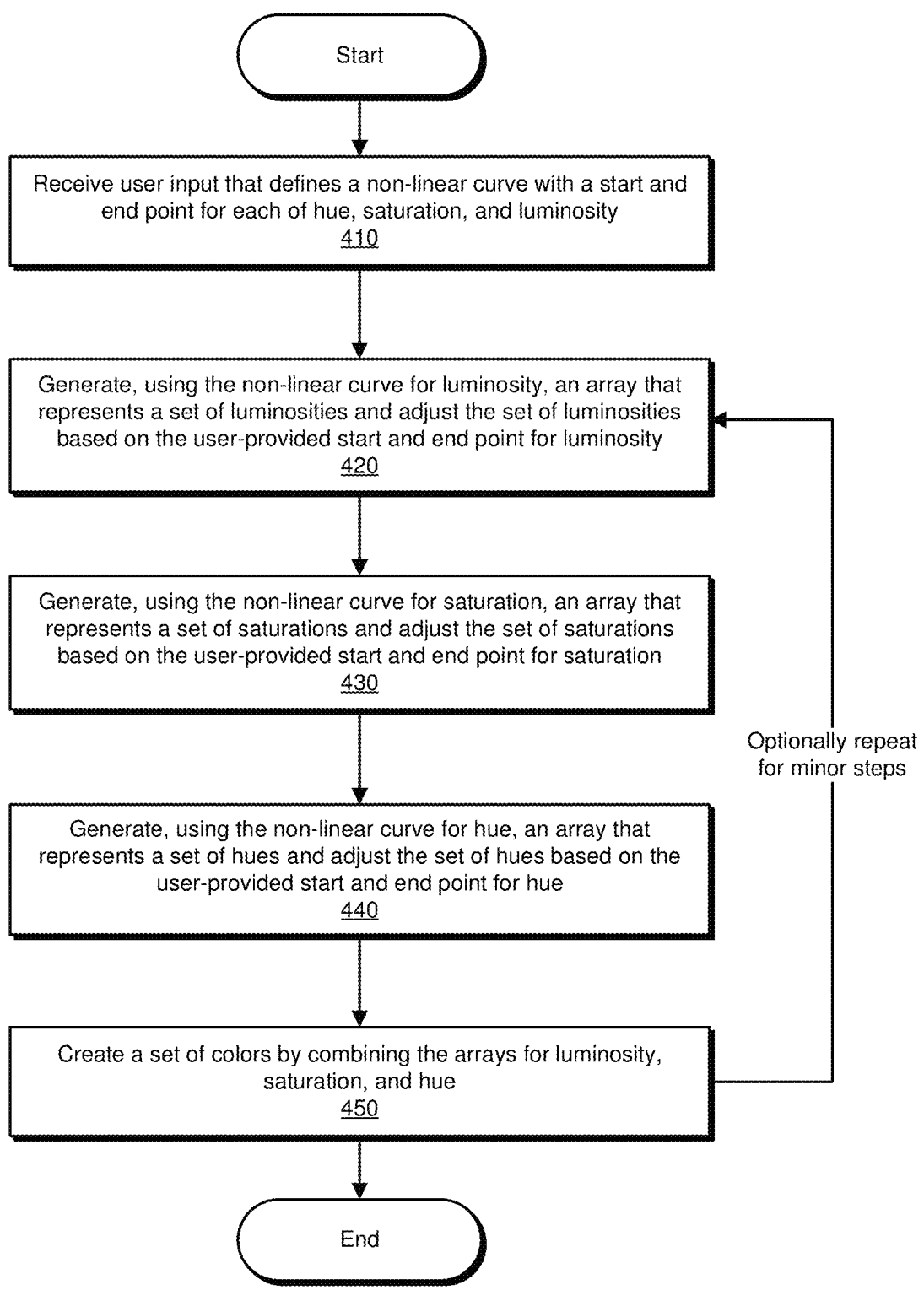
FIG. 4 is a flow diagram of an example method for generating accessible color schemes.

FIG. 4 is a flow diagram of an example method for generating accessible color schemes. In some examples, at step 410, the systems described herein may Receive user input that defines a non-linear curve with a start and end point for each of hue, saturation, and luminosity. For example, the systems described herein may enable a user (e.g., a designer and/or developer) to specify a type of curve (e.g., quadratic Bezier, cubic Bezier, etc.), a starting point for the curve, an ending point for the curve, and/or the number of steps (i.e., points on the curve that will be translated into colors). In some examples, the systems described herein may also receive input from a user providing a human-readable name for the colors in the color scheme, such as "magenta" or "blue." For example, as illustrated in FIG. 5, the systems described herein may receive input similar to input 500. Input 500 may include parameters such as a human-readable name of the color, a number of total steps (i.e., of colors in the color scheme), the functions to determine the curves through luminosity, saturation, and/or hue (e.g., selected from a predetermined set of functions such as quadratic Bezier curves), the starting and/or ending values for luminosity, saturation, and/or hue, the rate with which saturation progresses, and/or the number of minor steps, if any, and where to add such steps in the color progression (e.g., add one minor step between the first and second colors).

Returning to FIG. 4, at step 420, the systems described herein may generate, using the non-linear curve for luminosity, an array that represents a set of luminosities. Next, the systems described herein may adjust the set of luminosities based on the user-provided start and end point for luminosity. For example, the systems described herein may generate an array with values ranging from zero to one and may then map those values onto the starting point and ending point provided by the user. In some examples, the size of the array and/or the distance between values (e.g., the values provided to the function that defines the curve) may be determined by the number of steps provided by the user. At step 430, the systems described herein may generate, using the non-linear curve for saturation, an array that represents a set of saturations and may then adjust the set of saturations based on the user-provided start and end point for saturation. Similarly, at step 440, the systems described herein may generate, using the non-linear curve for hue, an array that represents a set of hue and may then adjust the set of hues based on the user-provided start and end point for hue. At step 450, the systems described herein may create a set of colors by combining the arrays for luminosity, saturation, and hue. In some examples, the systems described herein may then repeat steps 420 through 450 for minor steps (i.e., colors in between any two adjacent colors of the main color scheme).

Figure 6:
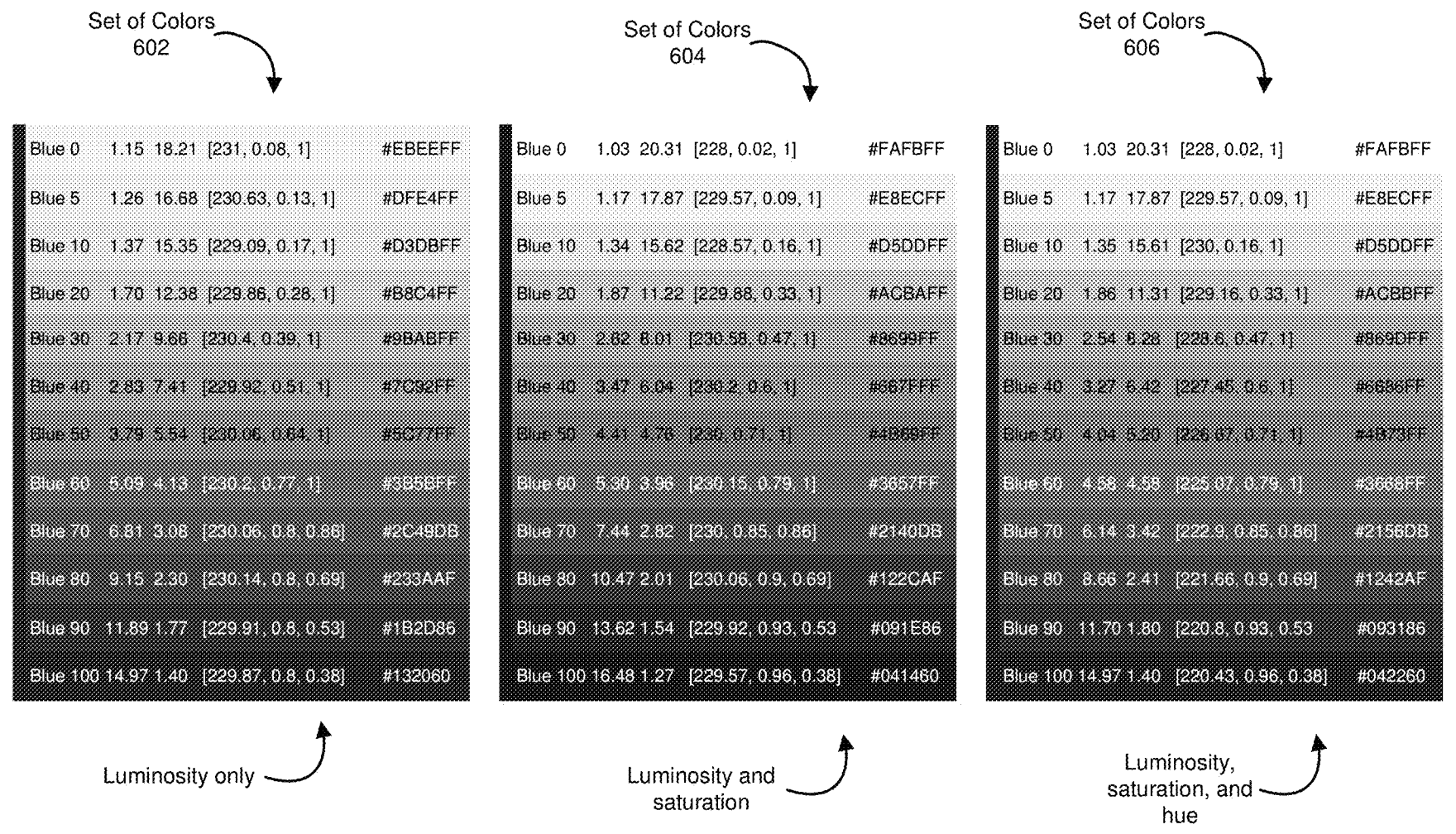

FIG. 6 is an illustration of an example color scheme generated based on a non-linear function. As illustrated in FIG. 6, the systems described herein may produce a set of colors 602 after generating an array of values for luminosity, as discussed in step 420 in FIG. 4. Next, the systems described herein may generate and apply an array of saturation values, producing a set of colors 404. In some embodiments, the systems described herein may then generate and apply a set of hue values, producing set of colors 406. In some examples, set of colors 406 may be the set of colors used for a color scheme. In some examples, set of colors 406 may be a blue color scheme and colors "blue 0" through "blue 50" may have acceptable contrast with black while colors "blue 60" through "blue 100" may have acceptable contrast with white.

In some embodiments, the systems described herein may enable a designer and/or developer to add additional colors to a previously generated color scheme. By providing the systems described herein with the same input that was used previously, a user may re-generate a color scheme. By providing additional input that specifies an additional step and/or minor step in the color scheme, the user may add an additional color to the previously generated color scheme.

Figure 7:
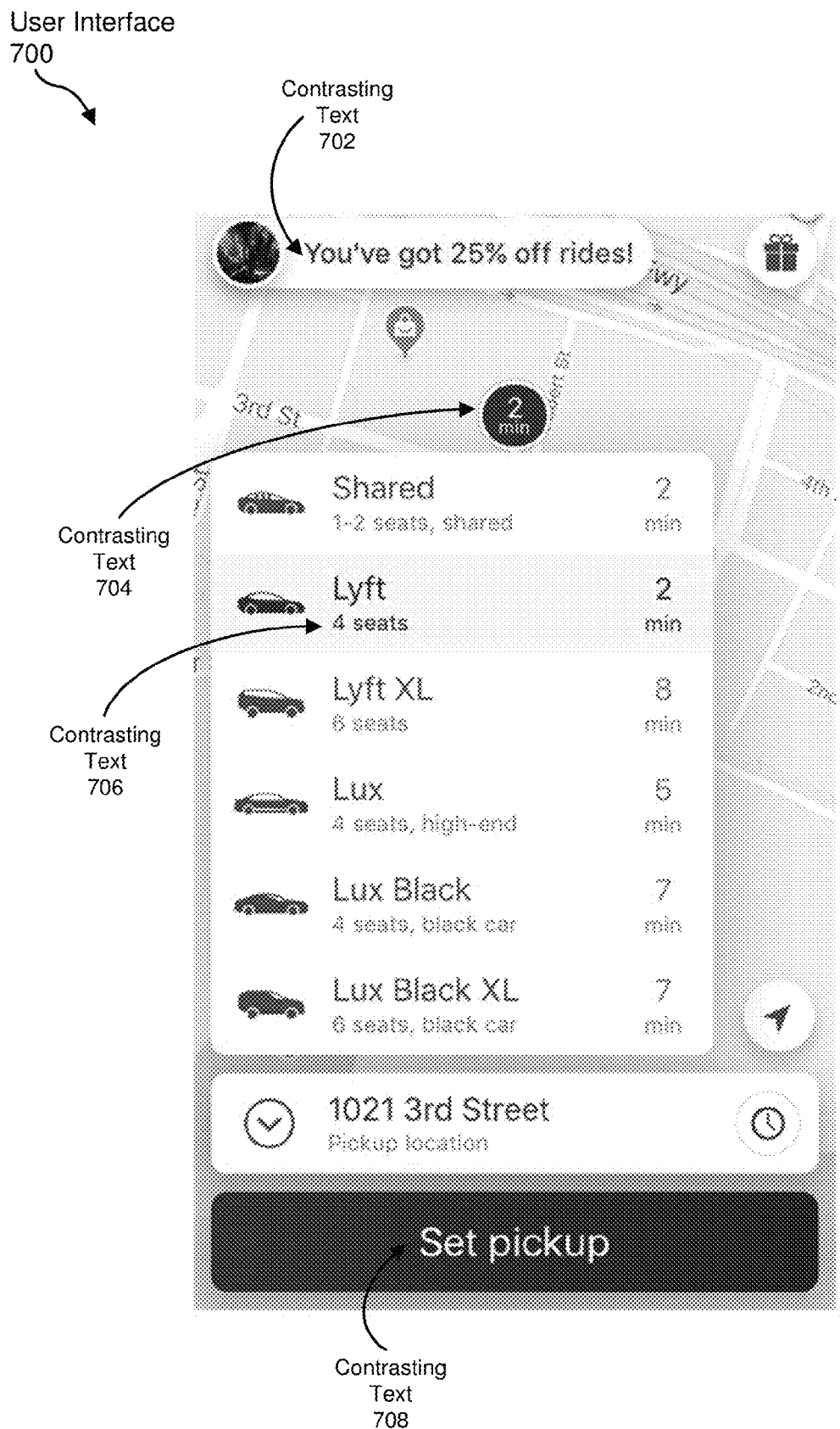
FIG. 7 is an illustration of an example user interface with a color scheme generated based on a non-linear function.

FIG. 7 is an illustration of an example user interface 700 with a color scheme generated based on a non-linear function. As illustrated in FIG. 7, user interface 700 may have various different areas that are colored with different colors from one or more color schemes and feature contrasting text and/or backgrounds. For example, contrasting text 702, 704, 706, and/or 708 may all contrast against different colors from one or more color schemes. In one example, contrasting text 702 and/or 706 may contrast dark colors from a color scheme against a white background while contrasting test 704 and/or 708 may contrast white text against dark colors from a color scheme. By using colors from a color scheme, user interface 700 may provide visual variety while keeping a consistent look.

Figure 8:
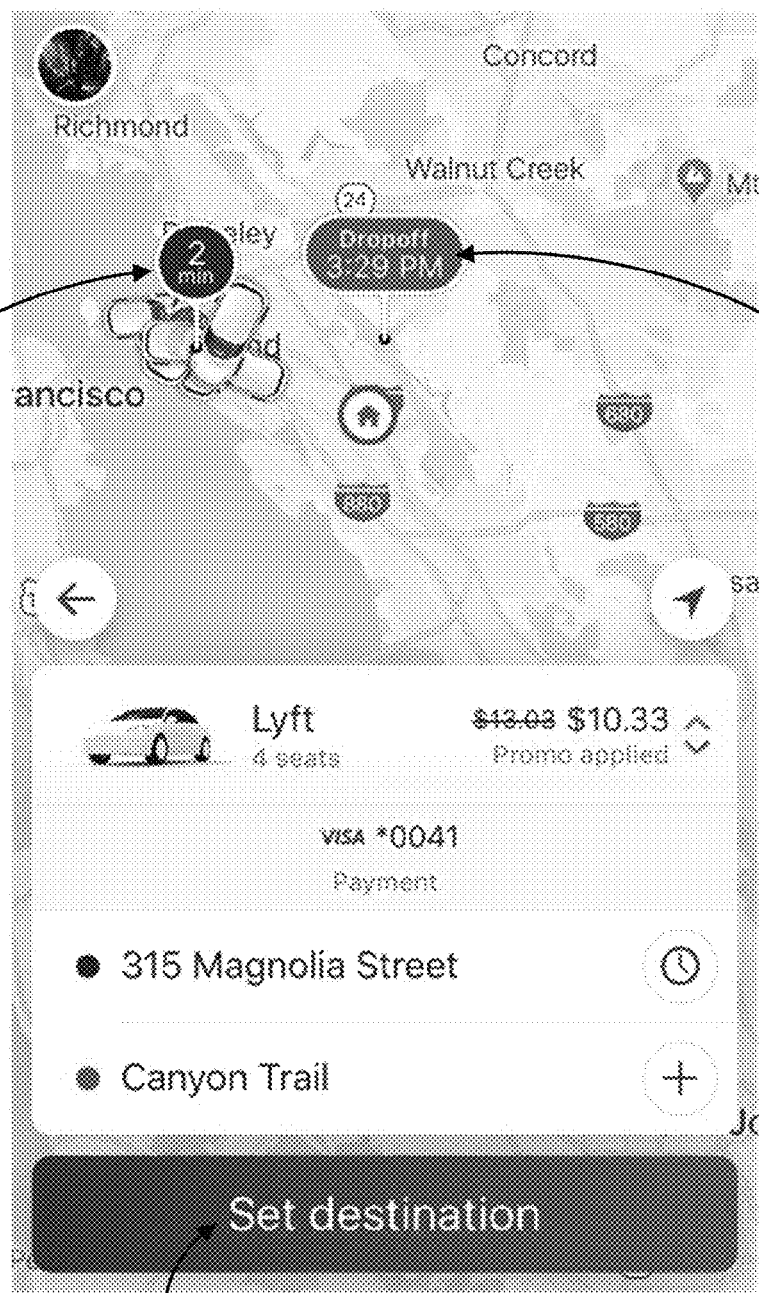
FIG. 8 is an illustration of an example user interface with a color scheme generated based on a non-linear function.

FIG. 8 is an illustration of an example user interface 800 with a color scheme generated based on a non-linear function. As illustrated in FIG. 8, user interface 800 may have contrasting text 802 that includes a color from a purple color scheme as well as contracting text 804 that includes a color from a pink color scheme. In some examples, user interface 800 may include contrasting text 806 that contrasts against a gradient between a color from the pink color scheme and a color from the purple color scheme. In some examples, because the color from the pink color scheme and the color from the purple color scheme are both dark colors, the gradient may also have good contrast against white.

Figure 9:
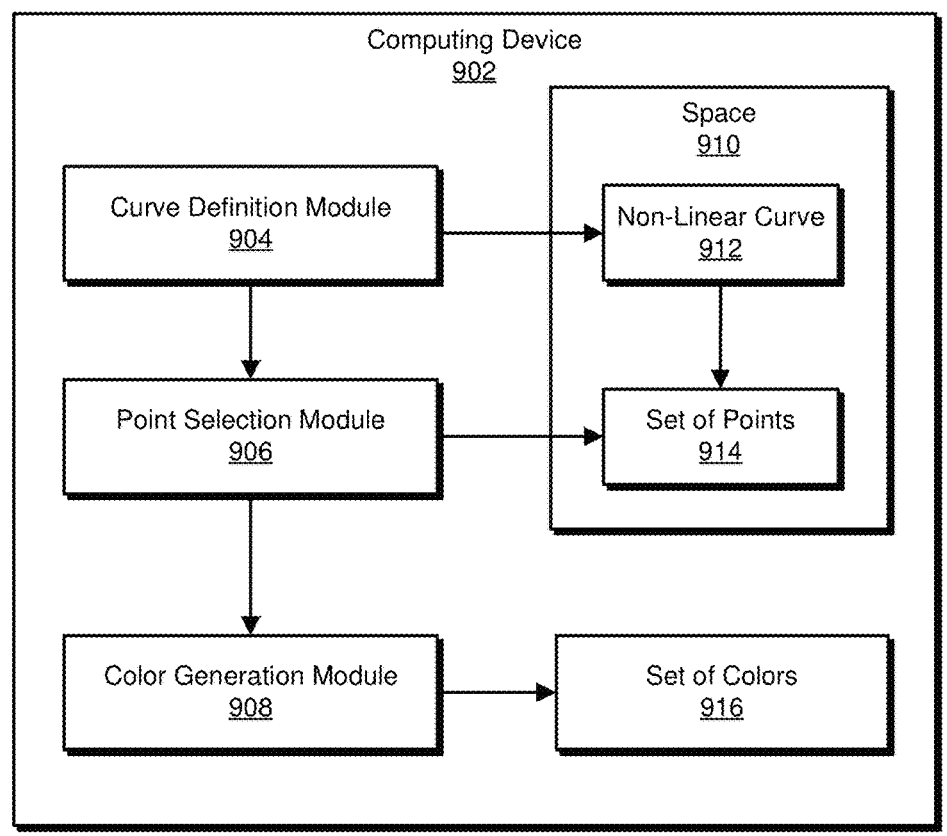
FIG. 9 is a block diagram of an example system for generating accessible color schemes.

FIG. 9 is a block diagram of an example system for generating accessible color schemes. In some embodiments, a computing device 902 may be configured with one or more modules that generate accessible color schemes. In one embodiment, a curve definition module 902 may define a non-linear curve 912 through a space 910 that includes at least two dimensions, where each dimension of the space represents an attribute of a color as described by a numerical value. Next, a point selection module 906 may select a set of points 914 within space 910 that fall on non-linear curve 912 based at least in part on set of points 914 falling on non-linear curve 912. Finally, a color generation module 908 may generate a color scheme 916 that includes a set of related colors by, for each point in set of points 914, defining a color within color scheme 916 based on at least in part on the attribute of the color described by a numerical value of the point within the dimension of space 910 that represents the attribute.

Figure 10:
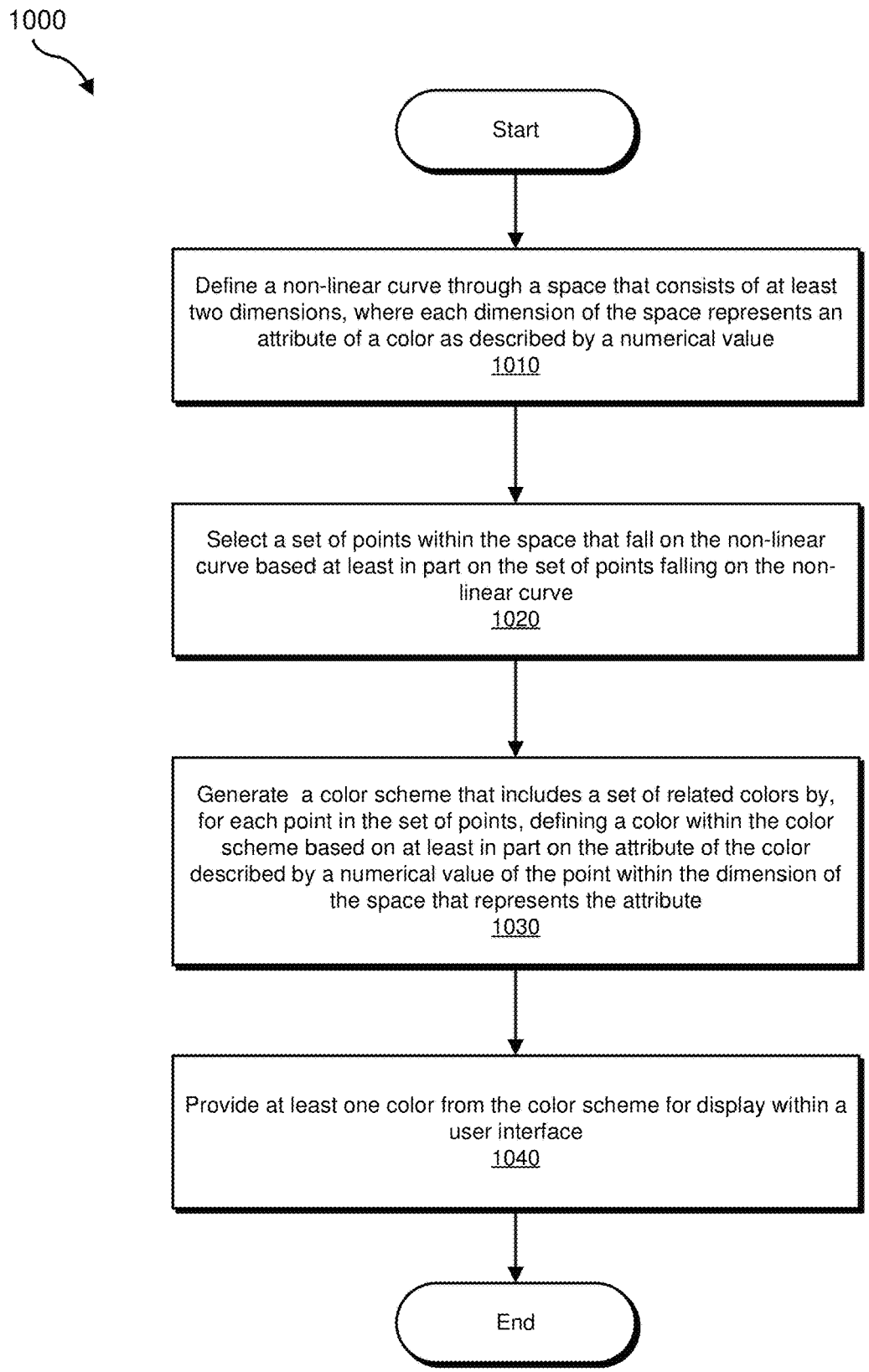
FIG. 10 is a flow diagram of an example method for generating accessible color schemes. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

FIG. 10 is a flow diagram of an example method for generating accessible color schemes. As illustrated in FIG. 10, at step 1010, one or more of the systems described herein may define a non-linear curve through a space that may include at least two dimensions, where each dimension of the space represents an attribute of a color as described by a numerical value.

In some examples, the systems described herein may define the non-linear curve through the space that includes the at least two dimensions by defining the non-linear curve through the space that includes three dimensions. In one embodiment, the three dimensions may include a dimension that represents a hue attribute of the color, a dimension that represents a luminosity attribute of the color, and a dimension that represents a saturation attribute of the color.

In some examples, the systems described herein may define the non-linear curve by defining a non-linear curve that facilitates accessible color schemes by producing color schemes that each include a concentration of dark colors and a concentration of light colors. In some examples, systems described herein may enable a user to specify at least one of a starting point and an ending point of the non-linear curve. In one embodiment, the non-linear curve may include a Bezier curve.

In some examples, the systems described herein may define the non-linear curve by presenting a user with a plurality of representations of non-linear curves, receiving input from the user indicating a selection of a representation of the non-linear curve from among the plurality of representations of non-linear curves, and defining the non-linear curve in response to the input from the user indicating the selection of the representation of the non-linear curve.

At step 1020, one or more of the systems described herein may select a set of points within the space that fall on the non-linear curve based at least in part on the set of points falling on the non-linear curve.

In some examples, the systems described herein may select the set of points within the space that fall on the non-linear curve by selecting a set of points based at least in part on a predetermined distance between at least one numerical value of each point in the set of points and at least one corresponding numerical value of each additional point in the set of points that is immediately adjacent to the point.

At step 1030, one or more of the systems described herein may generate a color scheme including a set of related colors by, for each point in the set of points, defining a color within the color scheme based on at least in part on the attribute of the color described by a numerical value of the point within the dimension of the space that represents the attribute.

In one embodiment, the systems described herein may define the non-linear curve through the space that includes at least two dimensions by defining a plurality of non-linear curves each through a different space within a plurality of spaces, where each space includes at least one dimension that represents an additional attribute of a color. Next, the systems described herein may select a set of points within the space by selecting an additional set of points within each space within the plurality of spaces, based at least in part on the additional set of points falling on the non-linear curve through the space within the plurality of spaces. Finally, the systems described herein may generate the color scheme by, for each point in each additional set of points, defining a color within the color scheme based on at least in part on the attribute of the color described by a numerical value of the point within the dimension of the space that represents the attribute.

In some examples, systems described herein may apply a human-readable naming scheme to the color scheme that provides contrast information that enables an algorithmic determination of whether any color within the color scheme has sufficient contrast with any other color to meet a predetermined visual accessibility threshold for visual contrast.

In one embodiment the systems described herein may define the non-linear curve by receiving input from a user that specifies a non-linear curve, a starting value, and an ending value for each of a luminosity attribute of a color, a saturation attribute of a color, and/or a value attribute of a color. In this embodiment, the systems described herein may select the set of points within the space that fall on the non-linear curve based at least in part on the set of points falling on the non-linear curve may by (i) generating, based on the non-linear curve for the luminosity attribute, an array of values that represents the luminosity attribute, (ii) adjusting the array of values that represents the luminosity attribute to fall within the starting value and the ending value for the luminosity attribute, (iii) generating, based on the non-linear curve for the saturation attribute, an array of values that represents the saturation attribute, (iv) adjusting the array of values that represents the saturation attribute to fall within the starting value and the ending value for the saturation attribute, (v) generating, based on the non-linear curve for the hue attribute, an array of values that represents the hue attribute, and (vi) adjusting the array of values that represents the hue attribute to fall within the starting value and the ending value for the hue attribute. The systems described herein may then generate the color scheme by combining the array of values that represents the luminosity attribute, the array of values that represents the saturation attribute, and the array of values that represents the hue attribute.

In one embodiment, the systems described herein retrieve a previously generated color scheme, add an additional point that falls on the non-linear curve to a set of points that represent the previously generated color scheme, and add an additional color to the previously generated color scheme by defining the additional color within the color scheme based on at least in part on the attribute of the color described by a numerical value of the point within the dimension of the space that represents the attribute.

At step 1040, one or more of the systems described herein may provide at least one color from the color scheme for display within a user interface.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   defining a non-linear curve through a space that comprises at least two dimensions, wherein each dimension of the space represents an attribute of a color as described by a numerical value;
   selecting a set of points within the space that fall on the non-linear curve based at least in part on the set of points falling on the non-linear curve;
   generating a color scheme comprising a set of related colors by, for each point in the set of points, defining a color within the color scheme based at least in part on the attribute of the color described by a numerical value of the point within the dimension of the space that represents the attribute; and
   providing at least one color from the color scheme for display within a user interface.

2. The computer-implemented method of claim 1, wherein selecting the set of points within the space that fall on the non-linear curve comprises selecting a set of points based at least in part on a predetermined distance between at least one numerical value of each point in the set of points and at least one corresponding numerical value of each additional point in the set of points that is immediately adjacent to the point.

3. The computer-implemented method of claim 1, wherein:
   defining the non-linear curve through the space that comprises at least two dimensions comprises defining a plurality of non-linear curves each through a different space within a plurality of spaces, wherein each space comprises at least one dimension that represents an additional attribute of a color;
   selecting a set of points within the space comprises selecting an additional set of points within each space within the plurality of spaces, based at least in part on the additional set of points falling on the non-linear curve through the space within the plurality of spaces; and
   generating the color scheme comprises, for each point in each additional set of points, defining a color within the color scheme based at least in part on the attribute of the color described by a numerical value of the point within the dimension of the space that represents the attribute.

4. The computer-implemented method of claim 1, wherein defining the non-linear curve through the space that comprises the at least two dimensions comprises defining the non-linear curve through the space that comprises three dimensions.

5. The computer-implemented method of claim 4, wherein the three dimensions comprise:
   a dimension that represents a hue attribute of the color;
   a dimension that represents a luminosity attribute of the color; and
   a dimension that represents a saturation attribute of the color.

6. The computer-implemented method of claim 1, further comprising applying a human-readable naming scheme to the color scheme that provides contrast information that enables an algorithmic determination of whether any color within the color scheme has sufficient contrast with any other color to meet a predetermined visual accessibility threshold for visual contrast.

7. The computer-implemented method of claim 1, wherein defining the non-linear curve comprises defining a non-linear curve that facilitates accessible color schemes by producing color schemes that each comprise a concentration of dark colors and a concentration of light colors.

8. The computer-implemented method of claim 1, wherein the non-linear curve comprises a Bezier curve.

9. The computer-implemented method of claim 1, further comprising enabling a user to specify at least one of a starting point and an ending point of the non-linear curve.

10. The computer-implemented method of claim 1, wherein:
    defining the non-linear curve comprises receiving input from a user that specifies a non-linear curve, a starting value, and an ending value for at least one attribute of a color; and
    selecting the set of points within the space that fall on the non-linear curve based at least in part on the set of points falling on the non-linear curve comprises:
        generating, based on the non-linear curve for the attribute, an array of values that represents the attribute; and
        adjusting the array of values that represents the attribute to fall within the starting value and the ending value for the attribute.

11. The computer-implemented method of claim 1, wherein:
    defining the non-linear curve comprises receiving input from a user that specifies a non-linear curve, a starting value, and an ending value for each of a luminosity attribute of a color, a saturation attribute of a color, and a hue attribute of a color;
    selecting the set of points within the space that fall on the non-linear curve based at least in part on the set of points falling on the non-linear curve comprises:
        generating, based on the non-linear curve for the luminosity attribute, an array of values that represents the luminosity attribute;
        adjusting the array of values that represents the luminosity attribute to fall within the starting value and the ending value for the luminosity attribute;
        generating, based on the non-linear curve for the saturation attribute, an array of values that represents the saturation attribute;
        adjusting the array of values that represents the saturation attribute to fall within the starting value and the ending value for the saturation attribute;
        generating, based on the non-linear curve for the hue attribute, an array of values that represents the hue attribute; and
        adjusting the array of values that represents the hue attribute to fall within the starting value and the ending value for the hue attribute; and generating the color scheme comprises combining the array of values that represents the luminosity attribute, the array of values that represents the saturation attribute, and the array of values that represents the hue attribute.

12. The computer-implemented method of claim 1, further comprising:

retrieving a previously generated color scheme;

adding an additional point that falls on the non-linear curve to a set of points that represent the previously generated color scheme; and adding an additional color to the previously generated color scheme by defining the additional color within the color scheme based at least in part on the attribute of the color described by a numerical value of the point within the dimension of the space that represents the attribute.

13. The computer-implemented method of claim 1, wherein defining the non-linear curve comprises:

presenting a user with a plurality of representations of non-linear curves;

receiving input from the user indicating a selection of a representation of the non-linear curve from among the plurality of representations of non-linear curves; and defining the non-linear curve in response to the input from the user indicating the selection of the representation of the non-linear curve.

14. A system comprising:

at least one hardware processor;

a memory device comprising instructions that, when executed by the at least one hardware processor, cause the at least one hardware processor to:

define a non-linear curve through a space that comprises at least two dimensions, wherein each dimension of the space represents an attribute of a color as described by a numerical value;

select a set of points within the space that fall on the non-linear curve based at least in part on the set of points falling on the non-linear curve;

generate a color scheme comprising a set of related colors by, for each point in the set of points, defining a color within the color scheme based at least in part on the attribute of the color described by a numerical value of the point within the dimension of the space that represents the attribute; and provide at least one color from the color scheme for display within a user interface.

15. The system of claim 14, wherein the instructions cause the at least one hardware processor to select the set of points within the space that fall on the non-linear curve by causing the at least one hardware processor to select a set of points based at least in part on a predetermined distance between at least one numerical value of each point in the set of points and at least one corresponding numerical value of each additional point in the set of points that is immediately adjacent to the point.

16. The system of claim 14, wherein:

the instructions cause the at least one hardware processor to define the non-linear curve through the space that comprises at least two dimensions, by causing the at least one hardware processor to define a plurality of non-linear curves each through a different space within a plurality of spaces, wherein each space comprises at least one dimension that represents an additional attribute of a color;

the instructions cause the at least one hardware processor to select a set of points within the space by causing the at least one hardware processor to select an additional set of points within each space within the plurality of spaces, based at least in part on the additional set of points falling on the non-linear curve through the space within the plurality of spaces; and the instructions cause the at least one hardware processor to generate the color scheme by causing the at least one hardware processor to, for each point in each additional set of points, define a color within the color scheme based at least in part on the attribute of the color described by a numerical value of the point within the dimension of the space that represents the attribute.

17. The system of claim 14, wherein the instructions cause the at least one hardware processor to define the non-linear curve through the space that comprises the at least two dimensions by causing the at least one hardware processor to define the non-linear curve through the space that comprises three dimensions.

18. The system of claim 17, wherein the three dimensions comprise:

a dimension that represents a hue attribute of the color;

a dimension that represents a luminosity attribute of the color; and a dimension that represents a saturation attribute of the color.

19. The system of claim 14, wherein the memory device further comprises instructions that cause the at least one hardware processor to apply a human-readable naming scheme to the color scheme that provides contrast information that enables an algorithmic determination of whether any color within the color scheme has sufficient contrast with any other color to meet a predetermined visual accessibility threshold for visual contrast.

20. A computer-readable medium comprising:

computer-readable instructions that, when executed by at least one processor of a computing device, cause the computing device to:

define a non-linear curve through a space that comprises at least two dimensions, wherein each dimension of the space represents an attribute of a color as described by a numerical value;

select a set of points within the space that fall on the non-linear curve based at least in part on the set of points falling on the non-linear curve;

generate a color scheme comprising a set of related colors by, for each point in the set of points, defining a color within the color scheme based at least in part on the attribute of the color described by a numerical value of the point within the dimension of the space that represents the attribute; and provide at least one color from the color scheme for display within a user interface.

* * * * *